United States Patent [19]

Coleman

[11] Patent Number: 4,731,289

[45] Date of Patent: Mar. 15, 1988

[54] ABRASION RESISTANT POLYURETHANE COATINGS FOR RIGID PLASTICS

[75] Inventor: Charles R. Coleman, Pittsburgh, Pa.

[73] Assignee: PPG Industries, Inc., Pittsburgh, Pa.

[21] Appl. No.: 935,107

[22] Filed: Nov. 24, 1986

Related U.S. Application Data

[63] Continuation of Ser. No. 500,123, Jun. 1, 1983, abandoned, which is a continuation-in-part of Ser. No. 121,343, Feb. 14, 1980, abandoned.

[51] Int. Cl.[1] ............... C08G 18/64; B32B 27/36; B32B 27/40
[52] U.S. Cl. ................... 428/334; 428/412; 428/423.3; 428/423.7; 428/423.1; 428/424.4; 264/171.1; 264/171
[58] Field of Search ............ 428/334, 412, 423.1, 428/423.3, 424.4, 423.7

[56] References Cited

U.S. PATENT DOCUMENTS

| | | | |
|---|---|---|---|
| 4,010,311 | 3/1977 | Lewis et al. | 428/412 |
| 4,035,548 | 7/1977 | Chang et al. | 428/412 |
| 4,045,269 | 8/1977 | Voss et al. | 156/221 |
| 4,079,160 | 3/1978 | Philipson | 428/217 |
| 4,174,240 | 11/1979 | Muller et al. | 156/99 |
| 4,355,077 | 10/1982 | Chevreux et al. | 428/413 |

Primary Examiner—P. C. Ives
Attorney, Agent, or Firm—Donna L. Seidel

[57] ABSTRACT

A method is disclosed for casting a colorless, single phase liquid reaction mixture comprising an aliphatic diisocyanate and a polyester polyol against a rigid transparent plastic and curing at a sufficiently rapid rate at temperatures of about 175° to 275° F. (about 79° to 135° C.) to form a relatively soft, resilient, abrasion resistant branched polyurethane coating without warpage or deterioration of the rigid plastic. The polyesterurethane coatings disclosed are characterized by durometer values at 70° F. between Shore A 50 and Shore D 80, and molecular weights between branch points between 1000 and 13,000.

9 Claims, No Drawings

ABRASION RESISTANT POLYURETHANE COATINGS FOR RIGID PLASTICS

CROSS REFERENCE TO RELATED APPLICATION

This application is a continuation of U.S. application Ser. No. 500,123 filed June 1, 1983 which in turn is a continuation-in-part of U.S. Ser. No. 121,343 filed Feb. 14, 1980, both now abandoned.

BACKGROUND OF THE INVENTION

The present invention relates generally to polyurethane compositions, and more particularly to polyesterurethane compositions which can be cast and cured to form abrasion resistant coatings on rigid plastics.

U.S. Pat. No. 4,045,269 to Voss et al discloses a method for producing clear, cured, transparent polycarbonate laminates by directly bonding a transparent thermosetting rigid polyurethane sheet to a polycarbonate sheet to produce a laminate, heating the laminate above the softening point of the polycarbonate sheet, and forming the laminate to a desired curvature.

U.S. Pat. No. 4,035,548 to Chang et al describes safety glass laminates with energy absorbing interlayers made from poly(lactone-urethane). The safety glass laminates may be formed by casting a liquid polyurethane-forming reaction mixture between a pair of glass sheets and curing in place to produce a trilayer laminate. For a bilayer laminate, one of the glass sheets is coated with a release agent so that after the interlayer material has been cast and cured in place, the glass sheet with the release surface can be easily separated.

U.S. Pat. No. 4,010,311 to Lewis et al describes laminated articles of at least one sheet of rigid, transparent material such as glass, and a sheet of energy absorbing polyesterurethane which is the reaction product of a cycloaliphatic diisocyanate and a relatively low molecular weight hydroxy-terminated aliphatic polyester without added amounts of an active hydrogen-containing material. The polyesterurethane may be adhered to the rigid sheet by casting it against the material and curing the polyesterurethane in place.

U.S. Pat. No. 4,079,160 to Phillipson teaches an optical element, such as an eyeglass lens, formed of a typically rigid polymeric substrate of relatively low scratch resistance coated on at least one surface with a relatively soft, resilient and tough, transparent polymeric material.

U.S. Pat. No. 4,174,240 to Muller teaches laminates wherein glass or glass-like plastics are coated with a transparent film 0.1 to 5 millimeters thick formed from a polyurethane polyurea containing 1 to 20 percent by weight urea groups and 0.001 to 10 percent by weight lateral —COOH groups.

SUMMARY OF THE INVENTION

The present invention involves the use of relatively soft, resilient branched polyesterurethanes as abrasion resistant coatings on rigid plastic materials such as acrylic and polycarbonate which are easily scratched. The polyesterurethanes of the present invention are characterized by a durometer value at 70° F. (21° C.) between about Shore A 50 and Shore D 80 and a molecular weight between branch points of about 1000 to 13,000. The present invention further involves a method of casting such polyesterurethane compositions against a rigid plastic substrate and curing in place at a sufficiently rapid rate to avoid warpage and deterioration of the rigid plastic surface which can result from prolonged exposure to isocyanate at high temperatures. The coated plastics are especially useful as aircraft transparencies comprising a substrate such as acrylic or polycarbonate protected on one or both exposed surfaces by an abrasion resistant polyesterurethane liner in accordance with the present invention.

DESCRIPTION OF THE PREFERRED EMBODIMENT

A castable, fast-curing branched aliphatic polyesterurethane is prepared from a reaction mixture of an aliphatic organic diisocyanate and a substantially equivalent proportion of polyol. The polyol comprises polyester, which may include polycarbonate, segments and may further comprise a low molecular weight diol or triol. Preferred polyester polyols have a ratio of about 1:5 ester to hydrocarbon groups. Sufficient catalyst is added to cure the polyurethane composition before the diisocyanate deteriorates the rigid plastic surface. Butyl stannoic acid is preferred because it provides both rapid cure at elevated temperatures and good pot life at lower temperatures according to U.S. Pat. No. 4,131,605 the disclosure of which is incorporated herein by reference.

The diisocyanate is preferably a cycloaliphatic diisocyanate such as 4,4'-methylene-bis-(cyclohexyl isocyanate). Polyurethanes prepared from aliphatic isocyanates, particularly cycloaliphatic diisocyanates, have high impact resistance over a wide temperature range and are not adversely affected by ultraviolet light. In addition to the most preferred diisocyanate, 4,4'-methylene-bis(cyclohexyl isocyanate), other suitable aliphatic diisocyanates include 1,4 cyclohexyl diisocyanate, 4,4'-bis-(cyclohexyl isocyanate), isophorone diisocyanate, and other dinuclear cycloaliphatic diisocyanates formed through an alkylidene bridging group of from 1 to 3 carbon atoms.

Polyols useful according to the present invention may be liquid at room temperature or soluble in the reaction mixture. Preferred polyols include polycaprolactone diols and triols of molecular weight about 300 to 2000, polybutylene and polyhexylene adipate diols, and polycarbonate diols of molecular weight about 100 to 2000. Useful chain extenders include such low molecular weight polyols as 1,12 dodecanediol, preferably 1,4 butanediol, 1,6 hexanediol and 1,4 cyclohexanedimethanol. The combination and molecular weights of polyols are chosen to meet the criterion that the branched polyurethanes formed therefrom are abrasion-resistant and have a molecular weight between branch points of at least 400, preferably from about 1000 to 13,000, more preferably above about 3200, most preferably above about 6000. The tear strength of the resultant polyurethane is typically around 10 pli (pounds per lineal inch) in the temperature range of 275° to 285° F. (about 135° to 141° C.). A particularly preferred polyol comprises polycaprolactone triol of molecular weight 300 to 1000 made by ring opening epsilon caprolactone with trimethylolpropane, and polycaprolactone diol of molecular weight about 300 to 1200. The ester content of the polyol is preferably limited to one ester group per five hydrocarbons.

The aliphatic diisocyanate and polyol are preferably mixed together under vacuum in a reaction kettle until the reaction mixture is single phase and well degassed. The reaction mixture further comprises a catalyst, preferably butyl stannoic acid when the mixture is to be cast by gravity feed and pot life is important, dissolved in a polyol compatible with the reaction mixture. The catalyst is preferably added to a level of about 100 to 1000 parts per million and is most preferably dissolved in the reactant polyol.

The reaction mixture is preferably cast into a mold comprising a ply of a rigid plastic such as polycarbonate, acrylic or rigid polyurethane spaced from a second ply, typically glass coated with a material from which the polyurethane will release. The reaction mixture is then cured in place against the rigid plastic sheet at temperatures preferably from about 175° to 275° F. (about 79° to 135° C.), more preferably about 225° F. (about 107° C.) for about 1 hour or longer to yield an abrasion resistant coating preferably about 5 to 50 mils (about 0.1 to 1.3 millimeters) thick on the plastic sheet without warpage or interface deterioration from diisocyanate which typically results from long exposures at elevated temperatures. The abrasion resistance of the coated articles is far superior to that of the substrate material. As measured after 300 passes on a Bayer Abrader, the coated articles exhibit less than 25 percent haze, compared with 50 to 60 percent haze or higher for acrylic or polycarbonate uncoated substrates. Preferably, the abrasion resistance of the coating is even higher; for example, less than 10 percent haze for exterior coatings. For interior coatings, where weather resistance is less critical, abrasion resistance can readily be increased to less than 2 percent haze after abrasion testing, which may also be performed on a Taber Abraser.

The present invention will be more fully understood from the descriptions of specific examples which follow.

EXAMPLE I

The following components are mixed together to yield a colorless, transparent, single phase, low viscosity reaction mixture at room temperature:

| Component | Equivalent Weight | Equivalent Ratio | Weight Percent |
| --- | --- | --- | --- |
| Polycaprolactone triol | 102.6 | 0.22 | 5.9 |
| Polycaprolactone diol | 270 | 0.73 | 51.9 |
| Polycaprolactone diol (containing 1 percent butyl stannoic acid) | 505 | 0.05 | 7.5 |
| 4,4'-methylene-bis-(cyclohexyl isocyanate) | 131 | 1.00 | 34.6 |

The reaction mixture is cast into a mold comprising an ⅛ inch (about 3 millimeters) thick polycarbonate sheet and a release coated glass sheet. The reaction mixture cures to form an abrasion resistant polyurethane which has a calculated urethane content of about 15.7 percent and a theoretical molecular weight between branch points of about 3400. The coated polycarbonate sheet is useful as an aircraft window with the polyurethane coating on the inboard surface.

EXAMPLE II

A polyurethane composition is cast onto polycarbonate and cured at elevated temperature for use as an interior surface of an aircraft transparency. The composition comprises:

| Component | Molecular Weight | Weight Percent |
| --- | --- | --- |
| Polycaprolactone triol | 900 | 17.59 |
| Polycaprolactone diol | 550 | 43.91 |
| Polycaprolactone diol (containing 1% butyl stannoic acid) | 1000 | 7.22 |
| 4,4'-methylene-bis-(cyclohexyl isocyanate) | 262 | 31.28 |

The resulting polyurethane has a urethane content of about 14.1 percent, a molecular weight between branch points of about 2510, no hard segment and a Shore A durometer value of 56° at 70° F. (21° C.). The coating exhibits a haze increase of only 0.9 percent after 1000 cycles on a Taber Abraser.

EXAMPLE III

A polyurethane composition is cast and cured as in the previous example for use as an interior surface of an aircraft transparency. The composition comprises:

| Component | Molecular Weight | Weight Percent |
| --- | --- | --- |
| Polycaprolactone triol | 900 | 9.34 |
| Polycaprolactone diol | 1200 | 48.13 |
| 1,4 butanediol | 90 | 6.98 |
| Butyl stannoic acid (dissolved in above 1,4 butanediol) | — | .06 |
| 4,4'-methylene-bis-(cyclohexyl isocyanate) | 262 | 35.49 |

The resulting polyurethane has a urethane content of about 15.9 percent, a molecular weight between branch points of about 6600, 27.3 percent hard segment and a Shore A durometer value of 72. The coating exhibits a haze increase of 0.8 percent after 1000 cycles on a Taber Abraser compared with 31 percent for uncoated polycarbonate after only 100 cycles.

EXAMPLE IV

A polyurethane composition is cast and cured as in the previous examples. The composition provides a stiffer coating to reduce water spotting in exterior use and further comprises ultraviolet light and oxidation stabilizers. The composition comprises:

| Component | Molecular Weight | Weight Percent |
| --- | --- | --- |
| Trimethylolpropane | 135 | 0.87 |
| Polycaprolactone diol | 1000 | 46.45 |
| Cyclohexanedimethanol | 144 | 12.83 |
| Butyl stannoic acid (dissolved in above cyclohexane dimethanol) | — | 0.06 |
| 4,4'-methylene-bis-(cyclohexyl isocyanate) | 262 | 37.80 |
| Tinuvin 328 (substituted benzotriazole ultraviolet light stabilizer | — | 1.0 |
| Irganox 1035 (high molecular weight, hindered phenolic antioxidant) | — | 1.0 |

The resulting polyurethane has a urethane content of about 17.0 percent, a molecular weight between branch points of about 10,500, a hard segment of about 39.4 percent and a Shore D durometer value of 67. The coating exhibits a haze increase of 2.2 percent after 300 passes on a Bayer Sand Abrader.

EXAMPLE V

A polyurethane composition comprising the following components is prepared for use as in Example IV.

| Component | Molecular Weight | Weight Percent |
| --- | --- | --- |
| Trimethylolpropane | 135 | 0.98 |
| Polycaprolactone diol | 1000 | 37.52 |
| Cyclohexanedimethanol | 144 | 16.65 |
| Butyl stannoic acid (dissolved in above cyclohexane dimethanol) | — | 0.06 |
| 4,4'-methylene-bis-(cyclohexyl isocyanate) | 262 | 42.79 |
| Tinuvin 328 | — | 1.0 |
| Irganox 1035 | — | 1.0 |

The resulting polyurethane has a urethane content of about 19.3 percent, a molecular weight between branch points of about 9400, a hard segment of about 50.5 percent and a Shore D durometer value of 80. The coating exhibits a haze increase of 8.1 percent after 300 passes on a Bayer Sand Abrader.

EXAMPLE VI

A polyurethane composition comprising the following components is cast and cured as in the previous examples:

| Component | Molecular Weight | Weight Percent |
| --- | --- | --- |
| Polycaprolactone triol | 900 | 50.27 |
| 1,4 butane diol | 90 | 6.40 |
| 4,4'-methylene-bis-(cyclohexyl isocyanate) | 262 | 41.75 |
| Polycaprolactone diol (containing 1% butyl stannoic acid) | 1000 | 1.57 |

The resulting polyurethane has a urethane content of about 18.5 percent, a molecular weight between branch points of about 1200, a hard segment of about 24.8 percent and a Shore D durometer value of 62 at 70° F. (21° C.). The coating exhibits a haze increase of 9.0 percent after 300 passes on a Bayer Sand Abrader.

The above examples are offered to illustrate the present invention. Various modifications, such as the coating of other rigid plastics, such as acrylic and rigid polyurethanes, are included within the scope of the invention, which is defined by the following claims.

I claim:

1. An abrasion resistant branched polyurethane coated rigid plastic transparency comprising:
   a. a transparent rigid plastic substrate; and
   b. an abrasion resistant transparent branched polyurethane coating at least 5 mils thick formed from the reaction of an aliphatic diisocyanate and a polyol comprising a polyester polyol, said polyurethane having a durometer value at 70° F. between Shore A 50 and Shore D 80 and said polyol comprising sufficient triol to produce a branched polyurethane with a molecular weight between branch points between 1000 and 13,000

2. An abrasion resistant polyurethane coated plastic transparency according to claim 1, wherein the rigid transparent substrate is selected from the group consisting of polycarbonate, acrylic and polyurethane polymers having a durometer value at 70° F. of at least Shore D 80.

3. A plastic transparency according to claim 2, wherein the coating is formed from a polyol selected from the group consisting of polyester diols and triols, polycarbonate diols and triols, monomeric polyols and mixtures thereof.

4. A plastic transparency according to claim 3, wherein the polyol is selected from the group consisting of polycaprolactone diols and triols of molecular weight 300 to 2000, polybutylene and polyhexylene adipate diols, polycarbonate polyols of molecular weight 100 to 2000, butanediol, 1,6 hexanediol, 1,12 dodecanediol, cyclohexanedimethanol, trimethylolpropane and mixtures thereof.

5. A plastic transparency according to claim 4, wherein the coated surface, after 300 passes on a Bayer Abrader, exhibits less than 25 percent haze.

6. A plastic transparency according to claim 5, wherein the coated surface has a durometer value of at least Shore D 60 and exhibits less than 10 percent haze.

7. A plastic transparency according to claim 5, wherein the coated surface has a durometer value of about Shore A 50 to Shore A 80 and exhibits less than 2 percent haze.

8. A plastic transparency according to claim 5, wherein a first surface of the rigid plastic substrate is coated with an abrasion resistant polyester urethane having a durometer value of at least Shore D 60 and less than 10 percent haze, and a second surface of the rigid transparent substrate is coated with an abrasion resistant polyester urethane having a durometer value of about Shore A 50 to Shore A 80 and less than 2 percent haze.

9. A plastic transparency according to claim 8, wherein the coated substrate is installed in a vehicle with the first coated surface oriented toward the exterior of the vehicle.

* * * * *